United States Patent
Talpade et al.

(10) Patent No.: US 6,862,291 B2
(45) Date of Patent: Mar. 1, 2005

(54) METHOD AND SYSTEM FOR QUALITY OF SERVICE PROVISIONING FOR IP VIRTUAL PRIVATE NETWORKS

(75) Inventors: Rajesh Rasik Talpade, Madison, NJ (US); Gi Tae Kim, Morristown, NJ (US); Sunil Samtani, East Newark, NJ (US); Larry H. Wong, Parsippany, NJ (US); Petros Mouchtaris, Berkeley Heights, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 880 days.

(21) Appl. No.: 09/829,385

(22) Filed: Apr. 9, 2001

(65) Prior Publication Data

US 2002/0145982 A1 Oct. 10, 2002

Related U.S. Application Data

(60) Provisional application No. 60/245,597, filed on Nov. 3, 2000.

(51) Int. Cl.[7] .................................................. H04L 12/56
(52) U.S. Cl. ........................................ 370/412; 370/468
(58) Field of Search ................................ 370/352, 354, 370/355, 412, 468

(56) References Cited

U.S. PATENT DOCUMENTS 6,442,138 B1 * 8/2002 Yin et al. .................... 370/232
6,529,499 B1 * 3/2003 Doshi et al. ................. 370/352
6,744,767 B1 * 6/2004 Chiu et al. .............. 370/395.21

OTHER PUBLICATIONS

K. Kim, et al., "A Simple Admission Control Algorithm for IP Networks," Proceedings of International Conference on Networking, 2001.

G. Kim, et al., "QoS Provisioning for VoIP in Bandwidth Broker Architecture: A Simulation Approach," Proceedings of Communication Networks and Distributed Systems Modeling and Simulation Conference, 2001.

O. Altintas, et al., "A Methodology for Provisioning Quality of Service in IP Networks," International Workshop on Quality of Service, 2001.

* cited by examiner

*Primary Examiner*—Chau Nguyen
*Assistant Examiner*—Albert Chou
(74) *Attorney, Agent, or Firm*—Joseph Giordano

(57) ABSTRACT

Methods and systems are provided for provisioning a network by identifying the classes of traffic to be transported in the network as well as the QoS criteria of the identified classes of traffic. By simulating the classes of traffic, one or more QoS mechanisms and their associated parameters may be determined. The statistical multiplexing gains of the classes of traffic may also be determined based on the simulation. Then, one or more resources in the network may be allocated based on the QoS mechanisms and parameters as well as the multiplexing gains.

11 Claims, 4 Drawing Sheets

METHOD AND SYSTEM FOR QUALITY OF SERVICE PROVISIONING FOR IP VIRTUAL PRIVATE NETWORKS

CROSS REFERENCE TO RELATED APPLICATION

This application claims the benefit of U.S. Provisional Application No. 60/245,597, filed Nov. 3, 2000, the contents of which are hereby incorporated by reference.

BACKGROUND OF THE INVENTION

The present invention relates generally to communications networks, and more particularly, to a method and system for facilitating provisioning of networks to support different classes of traffic.

Packet networks, such as the Internet, are increasingly used to transport voice as well as data. Although using a common network infrastructure to transport both voice and data potentially offers significant cost advantages, network providers have not been able to provide a consistent quality of service (QoS) for voice communications over the Internet.

Unlike data communications, voice communications require timely reception of packets at a receiver in a network to achieve an acceptable QoS. This requires consistent low packet delays and losses in the network. Existing Internet Protocol (IP) networks including the Internet, however, generally do not provide consistent low packet delays and losses because they maximize the use of network resources through a statistical multiplexing method, which is suitable for best effort traffic, but not for real-time applications, such as voice.

The Internet Engineering Task Force (IETF) has attempted to solve this problem by implementing the Resource Reservation Protocol (RSVP) and Integrated Services. However, the RSVP and Integrated Services have failed to gain widespread acceptance because they require networks to maintain a per-flow state in network routers. Currently, IETF is considering a Differentiated Services effort to provide individual mechanisms for enabling different classes of traffic in a network. This method, however, does not provide an enabling methodology for use by Internet Service Providers (ISPs) in provisioning their networks to achieve a consistent QoS when transporting voice over their networks.

SUMMARY OF THE INVENTION

To overcome the above and other disadvantages of the prior art, methods and systems are provided for provisioning a network to support different classes of traffic, characterized, for example, by their respective QoS criteria.

Such methods and systems provision a network by identifying the classes of traffic to be transported in the network as well as the QoS criteria of the identified classes of traffic. By simulating the classes of traffic, one or more QoS mechanisms and their associated parameters may be determined. The statistical multiplexing gains of the classes of traffic may also be determined based on the simulation. Then, one or more resources in the network may be allocated based on the QoS mechanisms and parameters as well as the multiplexing gains.

In one embodiment, traffic classes and their associated QoS criteria may be characterized by, for example, one or more of packet loss, one-way time delay, packet jitter, loss distribution, or other similar factors.

In another embodiment, a request to establish a flow between two nodes in the network may be received. The request may include a desired bandwidth. A path between the two nodes may be identified and the available bandwidth along that path may be determined. If the available bandwidth along that path is sufficient to satisfy the request, the flow may be established. One or more nodes in the network through which the flow is established may be configured based on the QoS mechanisms and parameters.

In another embodiment, available bandwidth along a path in the network may be updated as follows: The path may be compared to a previous path to identify if links have been added or deleted. For every added link, the requested bandwidth may be subtracted from the available bandwidth on that link. For every deleted link, the requested bandwidth may be added to the available bandwidth for that link. Any link that has an available bandwidth of less than zero may then be identified as congested.

The summary of the invention and the following description for carrying out the best mode of the invention should not restrict the scope of the claimed invention. Both provide examples and explanations to enable others to practice the invention. The accompanying drawings, which form part of the description for carrying out the best mode of the invention, show several embodiments of the invention, and together with the description, explain the principles of the invention.

DESCRIPTION OF THE PREFERRED EMBODIMENTS

Reference will now be made in detail to the preferred embodiments of the invention, examples of which are illustrated in the accompanying drawings. Wherever possible, the same reference numbers will be used throughout the drawings to refer to the same or like parts.

Figure 1:
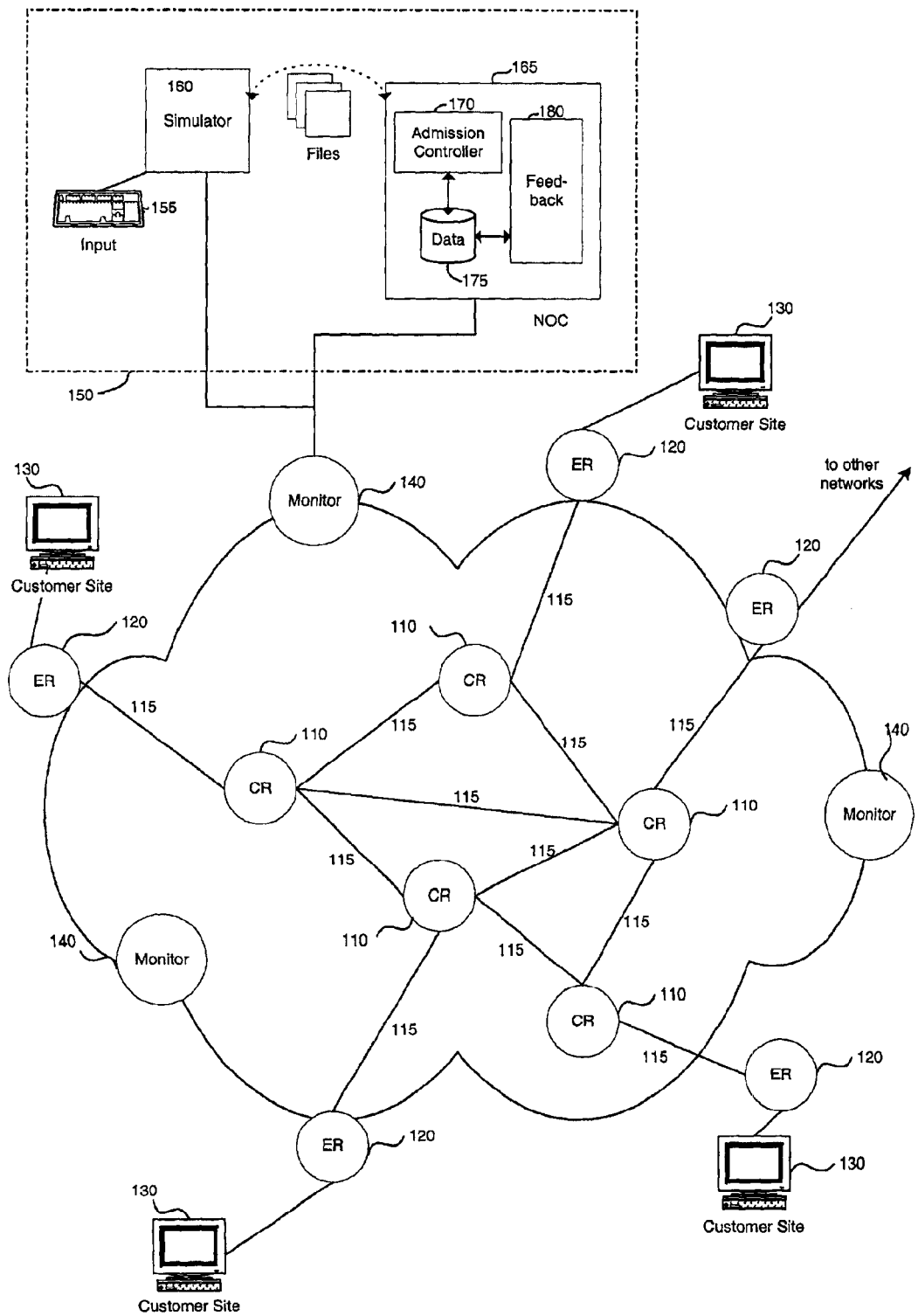
FIG. 1 illustrates an exemplary network, in accordance with methods and systems consistent with the present invention.

FIG. 1 illustrates a network 100 and a system 150, in accordance with methods and systems consistent with the present invention. The network 100, which may be owned and/or operated by an Internet Service Provider (ISP), may include a plurality of core routers 110 and edge routers 120, which may be connected to each other via links 115. The edge routers may also be on either the ISP's premises or the customer's premises. Edge routers 120 may each include one or more conditioning mechanisms, such as marking, shaping, and policing. A network operator may use marking mechanisms to configure an edge router to tag traffic to a specific traffic class. Shaping mechanisms may permit a network operator to configure an edge router to change the characteristics of traffic, such as reducing traffic rate. A network operator may use policing mechanisms to configure an edge router to drop traffic that violates preset thresholds.

Core routers 110 may include QoS or minimum bandwidth assurance mechanisms, such as Weighted Fair Queuing (WFQ) and Deficit Round Robin (DRR). Core routers 110 and edge routers 120 may be interconnected by a plurality of links 115. Customer sites 130, which may be also managed by the ISP and interface with edge routers 120, may communicate with each other through network 100.

Network 100 may interface with other ISP networks through one or more edge routers 120. In addition to core routers 110 and edge routers 120, network 100 may also include a number of monitor nodes 140. A monitor node 140 may gather information about the traffic transported through network 100, such as packet loss and one-way time delay on links 115 and provide that information to system 150.

System 150 may include an input device 155, a simulator 160, and a network operation center (NOC) 165. Input device 155 may include a direct data entry device, such as a keyboard, a device for indirect data entry, such as a floppy disk drive or CD-ROM, or a communication device, such as a modem, for receiving data from network 100. Data entered or received may include traffic classes and their respective source models, topology information about network 100 and one or more QoS criteria for applications, as selected by the ISP administrator. Applications may be running on customer sites 130. Data entered or received by input device 155 may be provided to simulator 160, which then simulates the traffic transported through network 100 based on the provided data. The output of simulator 160 may include QoS mechanisms and parameter values for provisioning network 100. This output may be provided to NOC 165 via a floppy disk or over a data link (not shown). Simulator 160 may include, for example, a personal computer or a workstation.

NOC 165 may include an admission controller 170, a data storage device 175, and a performance feedback component 180. NOC 165 may include, for example, a personal computer or a workstation. Admission controller 170 may receive requests to establish one or more services between a pair of edge routers 120 and determine if sufficient network resources exist to establish the requested services. Data storage device 175 may include data about the topology of network 100, the available bandwidth on each link 115 in network 100, a set of paths each including one or more links 115, and QoS data, such as QoS mechanisms and associated parameters. Performance feedback component 180 may receive information from monitors 140 as well as data storage device 175, and may function in conjunction with admission controller 170 to update available bandwidth on each link 115 and the set of paths stored in data storage device 175.

Figure 2:
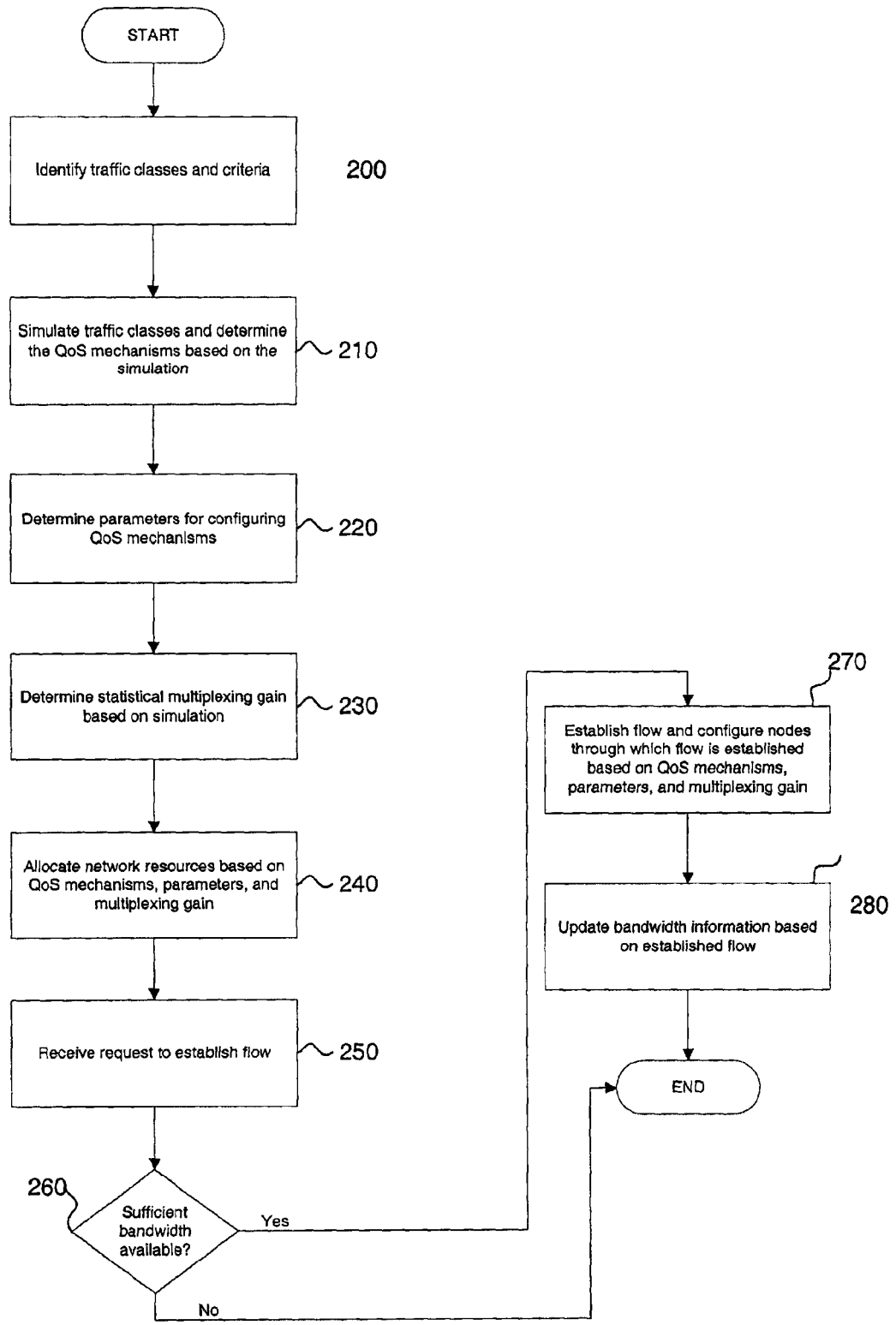
FIG. 2 is a flow chart of the steps for provisioning a network to support different traffic classes, in accordance with methods and systems consistent with the present invention.

FIG. 2 is a flow chart of the steps for provisioning the network 100 to support different IP traffic classes. First, the ISP administrator may identify the desired classes of traffic to be transported by network 100, source models for each class of traffic, and the respective QoS criteria for each class of traffic (step 200). A class of traffic may be characterized by one or more QoS criteria, such as a certain level of packet loss and/or one-way time delay that may be tolerated by the class of traffic. Other characterizations may include packet jitter and loss distribution. Source models may include information such as the packet size of the class of traffic as well as the amount of time the traffic is on or off. For example, in a voice-over IP application, there may be a distribution of talk time versus pause time, where packets are generated only during the talk time.

After identifying the classes of traffic and associated QoS criteria, the ISP may identify a set of applications to support and map each application to a class of traffic based on the QoS criteria of the application. While each application may be mapped to only one traffic class, each class of traffic may support one or more applications. Exemplary applications may include voice-over IP, Web TCP, and Best Effort. For example, voice-over IP may require a consistently low packet loss and delay. The ISP administrator may provide the identified classes of traffic, source models and QoS criteria, along with information about the topology of network 100, to the simulator 160 using input device 155.

Next, simulator 160 may simulate the classes of traffic and determine QoS mechanisms based on the simulation (step 210). For example, based on the bandwidth information on links 115, the traffic source models and the QoS criteria provided by the ISP administrator, simulator 160 may iteratively simulate traffic flow using various permutations of available QoS mechanisms to determine one or more QoS mechanisms that satisfy the QoS criteria of the classes of traffic. Exemplary mechanisms may include Token Bucket, Random Early Discard, Weighted Fair Queuing, and Deficit Round Robin.

Simulator 160 may then provide information about the iterations to facilitate the determination of QoS mechanisms for use in the core routers 110 and edge routers 120. Once the ISP administrator, based on the results of the simulation, determines a set of QoS mechanisms, simulator 160 may then determine the associated parameters of each of the QoS mechanisms satisfying the QoS criteria of the classes of traffic (step 220). This process may be similar to the simulation done to determine the appropriate QoS mechanisms.

Simulator 160 may also calculate the statistical multiplexing gains of the traffic classes based the QoS criteria (step 230). After the ISP administrator determines the appropriate QoS mechanisms and their associated parameters, the administrator may allocate one or more resources in the network 100 based on the determined QoS mechanisms and associated parameters and the calculated statistical multiplexing gain (step 240). For example, the ISP administrator may allocate resources by provisioning one or more routers in the network 100. The traffic classes and QoS criteria may be identified and network 100 may be provisioned, for example, off line.

Once network 100 is provisioned, the admission controller 170 may provide admission control for network 100. When a first customer site 130 wishes to communicate with another customer site 130, the first customer site 130 may send to the admission controller 170 a request for a connection (step 250). The customer request may also include the desired bandwidth for the communication. Admission controller 170 may then determine if there is sufficient bandwidth available to establish the requested flow (step 260). In one embodiment, the admission controller 170 may include a database of information about network 100, including information about a set of links 115 for each IP path as defined by edge router 120 pairs and the provisioned and available bandwidth for each IP-level link 115 in the network 100 for each traffic class. Alternatively, this information may be stored in data storage device 175.

Admission controller 170 may determine a path including one or more links 115 between the two customer sites 130 and further determine the available bandwidth on the links 115 in the determined path. If the available bandwidth is greater than or equal to the requested bandwidth, admission controller 170 may accept the request.

If admission controller 170 determines there is sufficient bandwidth available and the request is accepted, admission controller 170 may establish the communication flow between the customer sites 130 (step 270). Further, based on the determined QoS mechanisms, their associated parameters, and the determined multiplexing gain, the admission controller 170 may configure one or more of the nodes (including edge routers 120 and core routers 110) through which the flow is established.

Additional admission control features and embodiments consistent with the present invention may also be implemented using the methods and systems described in K. Kim, P. Mouchtaris, S. Samtani, R. Talpade, and L. Wong, "A Simple Admission Control Algorithm for IP Networks", in Proceedings of International Conference on Networking, 2001, which is incorporated herein in its entirety by reference.

Finally, performance feedback component 180 may dynamically update information about network 100 to provide better service, based on network information stored in data storage device 175 or admission controller 170 and data received from monitors 140 (step 280). To update the available bandwidth information, first performance feedback component may compare each path stored in data storage device 175 (or admission controller 170) to the current path to determine any changes, such as the addition or deletion of links 115. For every new or added link, performance feedback component 180 may subtract the requested bandwidth from the available bandwidth for the link. For each deleted link, performance feedback component may add the requested bandwidth to the available bandwidth for the link. Congested links may then be identified as those links with an available bandwidth of less than zero. In a network with a MultiProtocol Label Switching (MPLS) capability, alternative paths may be established to avoid bad and congested links.

Figure 3:
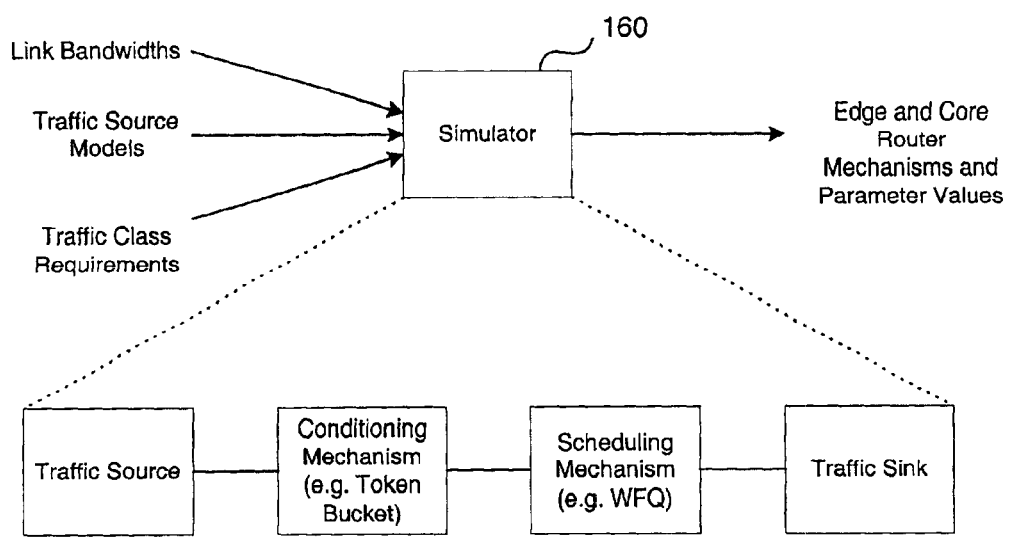
FIG. 3 is an block diagram illustrating a simulator for provisioning a network, in accordance with methods and systems consistent with the present invention.

FIG. 3 is a block diagram illustrating the step of simulating and provisioning of the network 100 (shown as step 210 in FIG. 2). Input to the simulator 160 may include the bandwidth of the links 115, traffic source models, and the QoS criteria associated with each traffic class. Traffic source models may include information about the size of the packets in each traffic class and how frequently packets are generated. Simulator 160 then may simulate each class of traffic according to the traffic source model and apply to one or more core routers 110 and/or edge routers 120 different conditioning mechanisms, such as Token Bucket, and scheduling mechanisms, such as Weighted Fair Queuing and Deficit Round Robin. Simulator 160 may provide information about which conditioning and/or scheduling mechanisms satisfy the QoS criteria for each class of traffic as well as the parameters for configuring these mechanisms. An ISP administrator may then determine a set of edge and core router QoS mechanisms and the associated parameters and provision the edge routers 120 and core routers 110 based on the simulation results.

Figure 4:
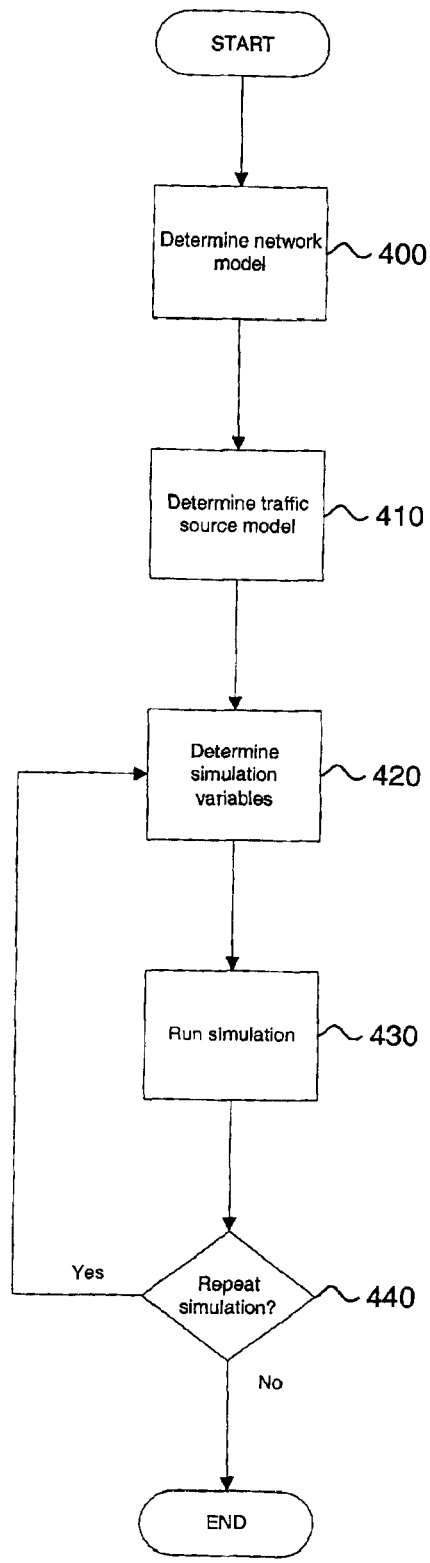
FIG. 4 is a flow chart of the steps for simulating traffic in a network, in accordance with methods and systems consistent with the present invention.

FIG. 4 is a flow chart of the steps for simulating traffic transported through network 100, in accordance with methods and systems consistent with the present invention. First, an ISP administrator may determine a model for network 100 (step 400). For example, the model of network 100 may be represented by a directed graph consisting of a set of nodes, including core routers 110 and edge routers 120, and a set of links 115 connecting the nodes. Each link 115 may include an associated bandwidth and/or an associated latency.

Next, the ISP administrator may determine a source model for each class of traffic transported through the network 100 (step 410). For each traffic class, the source model may include the size of the packets in the traffic class as well as the frequency with which the packets are generated. For example, a source model for voice traffic may reflect that a person's speech includes pause times. Therefore, the model for voice traffic may include a distribution of on periods (talking) and off periods (pause). Additionally, the model for voice traffic may include a packet size of, for example, 200-bytes.

After the network model and the source models are determined, the ISP administrator may configure the simulation environment in simulator 160 (step 420). In one embodiment, an LBNL Network Simulator 2 environment (available at http://www.isi.edu/snam/ns/) may be used to establish the simulation environment and represent network 100 based on the network model and source models. The ISP administrator may also select one or more simulation variables for each simulation run. Further, the simulation variables may be varied as part of the simulation, including the number of connections for each class of traffic, the link capacities, or the buffer size. Additionally, the configurations of the conditioning mechanisms may also be varied. For example, if the Token Bucket mechanism is included in edge routers 120, the simulation variables may then include the token rate or the token bucket depth.

For each choice of simulation variables, simulator 160 may be invoked to simulate network 100 (step 430). The simulation environment in simulator 160 may be configured based on the network model, the source models, and the chosen simulation variables. The simulation may run for a desired length of time, for example, 150 simulation seconds, may run until a number of packets have been sent, or may run until other criteria are met. Additionally, the simulation may run multiple times, such as three times, using the same simulation variables to obtain statistically significant results. During the simulation, simulator 160 may determine data, such as queuing delays, delay distribution, packet loss rates, and link utilization rates, based on which the ISP administrator may configure network 100. Following each run of the simulation, the simulation variables may be altered and the simulation may be repeated (step 440).

Once the simulation runs are completed, the ISP administrator may allocate one or more resources in network 100 as follows: For example, consider a first simulation using a Token Bucket mechanism in edge routers 120, with a token rate of 1.5 Mbps and a bucket depth of 20 packets. In a second simulation, a token rate of 1.5 Mbps and a bucket depth of 100 packets may be used instead. Finally, in a third simulation, a token rate of 10.0 Mbps and a bucket depth of 133 packets may be used. The data determined during these three simulations may indicate that the multiplexing gain associated with the token rate of 10.0 Mbps is the greatest. Thus, in configuring the Token Bucket mechanism in network 100, a token rate parameter of 10.0 may prove desirable.

Additional provisioning and simulation features and embodiments consistent with the present invention may also be implemented using the methods and systems described in G. Kim, P. Mouchtaris, S. Samtani, R. Talpade, and L. Wong, "QoS Provisioning for VoIP in Bandwidth Broker Architecture: A Simulation Approach", in Proceedings of Communication Networks and Distributed Systems Modeling and Simulation Conference, 2001; and O. Altintas, K. Kim, S. Samtani, R. Talpade, and L. Wong, "A Methodology for Provisioning Quality of Service in IP Networks", International Workshop on Quality of Service, 2001, both of which are incorporated herein in their entireties by reference.

While it has been illustrated and described what are at present considered to be preferred embodiments and methods of the present invention, it will be understood by those skilled in the art that various changes and modifications may be made, and equivalents may be substituted for elements thereof without departing from the true scope of the invention.

In addition, many modifications may be made to adapt a particular element, technique, or implementation to the teachings of the present invention without departing from the central scope of the invention. Therefore, it is intended that this invention not be limited to the particular embodiments and methods disclosed herein, but that the invention include all embodiments falling within the scope of the appended claims.

What is claimed is:

1. A method for configuring a network that includes a plurality of nodes connected by links, said method comprising the steps of:

identifying criteria for transporting classes of traffic in the network;

simulating the classes of traffic to determine one or more QoS mechanisms for configuring the nodes such that the identified criteria are satisfied;

determining parameters for configuring the determined QoS mechanisms based on the simulated classes of traffic;

determining multiplexing gains of the classes of traffic in the links based on the simulated classes of traffic; and configuring one or more resources in the network based on the determined QoS mechanisms, the determined parameters, and the determined multiplexing gains.

2. The method of claim 1 further comprising the steps of:

receiving a request for establishing a flow in the network; and configuring one or more of the nodes through which the flow is established according to the determined QoS mechanisms, the determined parameters, and the determined multiplexing gains.

3. The method of claim 2, wherein the step of receiving a request comprises the step of:

receiving from one of the nodes desiring to communicate with another one of the nodes, the request including information indicating a requested bandwidth.

4. The method of claim 2, further comprising:

determining a path that includes one or more of the links in the network;

determining an available bandwidth for each of the one or more links based on dynamically determined bandwidth information about the one or more links; and establishing the flow if the available bandwidth is greater than or equal to a requested bandwidth in the request.

5. The method of claim 1, further comprising the steps of:

comparing a previous path in the network with a current path in the network to identify links added to the previous path and links deleted from the previous path;

for each link added to the previous path, subtracting a requested bandwidth from an available bandwidth of the added link;

for each link deleted from the previous path, adding the requested bandwidth to an available bandwidth of the deleted link; and for each link added to the previous path, determining that the added link is congested if the available bandwidth of the added link is less than zero.

6. The method of claim 1, wherein the step of identifying the criteria comprises the step of:

defining each of the identified classes of traffic by at least one or more of packet loss, one-way time delay, packet jitter, or loss distribution.

7. The method of claim 1, wherein the step of simulating the classes of traffic comprises the step of:

determining a Token Bucket mechanism for configuring one or more of the nodes.

8. The method of claim 1, wherein the step of simulating the classes of traffic comprises the step of:

determining a Random Early Discard mechanism for configuring one or more of the nodes.

9. The method of claim 1, wherein the step of simulating the classes of traffic comprises the step of:

determining a Weighted Fair Queuing mechanism for configuring one or more of the nodes.

10. The method of claim 1, wherein the step of simulating the classes of traffic comprises the step of:

determining a Deficit Round Robin mechanism for configuring one or more of the nodes.

11. The method of claim 1, wherein the step of determining the multiplexing gains comprises the step of:

determining statistical multiplexing gains of the classes of traffic in the links based on the simulated classes of traffic.

* * * * *